United States Patent
Schneider et al.

(10) Patent No.: US 9,153,193 B2
(45) Date of Patent: Oct. 6, 2015

(54) PRIMITIVE RENDERING USING A SINGLE PRIMITIVE TYPE

(75) Inventors: Gerhard Schneider, Seattle, WA (US); Bede Jordan, Seattle, WA (US); Ashraf Michail, Redmond, WA (US); Brendan J. Clark, Seattle, WA (US); Pawel Wiktor Olszta, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 809 days.

(21) Appl. No.: 13/229,448

(22) Filed: Sep. 9, 2011

(65) Prior Publication Data

US 2013/0063464 A1 Mar. 14, 2013

(51) Int. Cl.
*G06T 11/20* (2006.01)
*G09G 5/00* (2006.01)

(52) U.S. Cl.
CPC . *G09G 5/00* (2013.01); *G06T 11/20* (2013.01)

(58) Field of Classification Search
USPC .......................................................... 345/581
See application file for complete search history.

(56) References Cited

U.S. PATENT DOCUMENTS

| | | |
|---|---|---|
| 6,452,595 B1 | 9/2002 | Montrym et al. |
| 6,529,207 B1 * | 3/2003 | Landau et al. ................ 345/619 |
| 7,432,937 B2 * | 10/2008 | Poddar et al. ................ 345/592 |
| 7,525,547 B1 | 4/2009 | Diard |
| 8,368,705 B2 * | 2/2013 | Green et al. .................. 345/522 |
| 8,698,837 B2 * | 4/2014 | Kilgard ........................ 345/620 |
| 2009/0128550 A1 | 5/2009 | Bakalash et al. |
| 2009/0201303 A1 | 8/2009 | Westerhoff et al. |
| 2009/0225079 A1 * | 9/2009 | Schechter et al. ............ 345/426 |
| 2011/0141133 A1 | 6/2011 | Sankuratri et al. |

OTHER PUBLICATIONS

Ray, et al., "Vector Texture Maps on the GPU", In Proceedings of Technical Report ALICE-TR-05-003, 2005, 6 pages.
"DirectX10 Tutorial 9: The Geometry Shader", Retrieved on: Aug. 18, 2011, Available at: http://takinginitiative.net/2011/01/12/directx10-tutorial-9-the-geometry-shader/.
Iourch, et al., "A Directionally Adaptive Edge Anti-aliasing Filter", In Proceedings of the 1st ACM Conference on High Performance Graphics, 2009, pp. 127-133.

* cited by examiner

*Primary Examiner* — Kee M Tung
*Assistant Examiner* — Ryan M Gray
(74) *Attorney, Agent, or Firm* — Kevin Sullivan; Aaron Hoff; Micky Minhas (57) ABSTRACT

Rendering different types of graphical content using a single primitive type. Embodiments enable graphical elements of different content types representing a scene to be rendered as a batch based on the single primitive type, thereby reducing data transfer and improving processing performance. For example, each graphical element in a batch of graphical elements can rendered based modifications to instances of a template shape, which represents a single primitive type usable for rendering different types of graphical content. The modifications to each instance can include modifying the instance according transformation data, clip data, and/or width and height data to position the instance in a scene, and filling the modified instance according to one or more of shape or brush data corresponding to the graphical element.

20 Claims, 5 Drawing Sheets

PRIMITIVE RENDERING USING A SINGLE PRIMITIVE TYPE

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many applications (including both operating system-level applications and end-user applications) include graphical user interfaces for displaying information to users and for receiving user input. While most graphical user interfaces have historically been relatively simple in terms of the computing resources consumed when rendering the user interfaces, many software developers now produce increasingly complicated user interfaces to provide enhanced user experiences. For example, many graphical user interfaces now incorporate user interface elements that employ transparency, animation, three-dimensional graphics, vector graphics, etc. to create rich, responsive, and fluid user exercises.

Many computer systems now include computer hardware optimized for processing and rendering graphics information. For example, some computer systems include one or more graphics processing units (GPUs) optimized for parallel graphics processing tasks. As a result, some interface frameworks and/or applications leverage GPUs for rendering user interfaces. Rendering a user interface using GPUs can involve representing each of the different graphical elements of the user interface in a format consumable by the GPU (e.g., as vertices of polygons and operations performed on those vertices). As such, rendering a user interface with GPUs can also involve using a variety of techniques for representing different types of graphical elements in formats consumable by a GPU. This can include analyzing each graphical element separately, and using different techniques for describing that graphical element as vertices of polygons. As such, each graphical element may be individually represented in a different manner (e.g., different sets of polygons) for consumption by the GPU(s).

This GPU-consumable representation of each graphical element can then be sent to the GPU(s) for processing and rendering. The process of passing data between applications and a GPU can be timely and expensive. For example, passing data can cause context switches at the GPU(s) and other processors and/or can involve passing data between threads or processes, the transfer of data over a bus, copying data between different types of physical memory, and the like. As such, graphical user interfaces that leverage a large number of interface elements can cause significant performance penalties to occur during rendering, as these user interfaces may pass a significant number of interface elements to the GPU(s).

BRIEF SUMMARY

Embodiments may include functionality for rendering different types of graphical content using a single primitive type. As such, embodiments enable graphical elements of different content types representing a scene to be rendered as a batch at a graphics processing unit (GPU), which reduces the amount of data transferred to the GPU and improves GPU processing performance.

For example, embodiments include a method for rendering different types of graphical content. The method includes receiving a definition of a template shape, which represents a single primitive type usable for rendering different types of graphical content. The method also includes receiving a request to render a batch of graphical elements, including graphical elements of differing content types. Based on the template shape, the method includes rendering each of the graphical elements in the batch. For each graphical element, rendering includes modifying an instance of the template shape according transformation data, clip data, and/or width and height data for the graphical element. For each graphical element, rendering also includes filling the modified instance of the template shape according to a shape of said graphical element and/or a brush representing filled content of the graphical element.

In addition, embodiments include a method for defining a graphical transformation function. The defining the transformation function includes defining a template shape, which is used to render different types of graphical elements, as well as defining an instancing data structure. The instancing data structure contains instance data for rendering a batch of graphical elements through modification of instances of the template shape. As such, defining the transformation function includes defining modifications to the template shape. These modifications can include (i) a first modification that alters size, position, orientation, and/or clip of an instance of the template shape based on a particular graphical element in the batch; and (ii) a second modification that fills the instance based on a shape and/or fill content of the particular graphical element.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments may include functionality for rendering different types of graphical content using a single primitive type. As such, embodiments enable graphical elements of different content types representing a scene to be rendered as a batch at a graphics processing unit (GPU), which reduces the amount of data transferred to the GPU and improves GPU processing performance.

For example, embodiments include a method for rendering different types of graphical content. The method includes receiving a definition of a template shape, which represents a single primitive type usable for rendering different types of graphical content. The method also includes receiving a request to render a batch of graphical elements, including graphical elements of differing content types. Based on the template shape, the method includes rendering each of the graphical elements in the batch. For each graphical element, rendering includes modifying an instance of the template shape according transformation data, clip data, and/or width and height data for the graphical element. For each graphical element, rendering also includes filling the modified instance of the template shape according to a shape of said graphical element and/or a brush representing filled content of the graphical element.

In addition, embodiments include a method for defining a graphical transformation function. The defining the transformation function includes defining a template shape, which is used to render different types of graphical elements, as well as defining an instancing data structure. The instancing data structure contains instance data for rendering a batch of graphical elements through modification of instances of the template shape. As such, defining the transformation function includes defining modifications to the template shape. These modifications can include (i) a first modification that alters size, position, orientation, and/or clip of an instance of the template shape based on a particular graphical element in the batch; and (ii) a second modification that fills the instance based on a shape and/or fill content of the particular graphical element.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, "netbook" computers, tablet computers, message processors, hand-held devices, multi-processor systems, microprocessor-based or programmable consumer electronics, network PCs, minicomputers, mainframe computers, mobile telephones, PDAs, media devices, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments may comprise computer systems optimized for processing and rendering graphics information. As such, embodiments include computer systems having one or more GPUs that process and render graphics information to build a scene in a frame buffer for display on a display device. The amount of memory used to describe graphical elements in terms consumable by a GPU can be significant. Thus, particularly when a large number of graphical elements are sent to a GPU for rendering, the amount of data to be transferred to the GPU can also be significant. While the penalties of this transfer may be manageable on powerful computing systems, these penalties may limit the ability of developers to produce rich graphical experiences on portable computing devices (e.g., smart phones, PDAs, portable media players, tablet computers, netbook computers, and the like) which can have limited processing, memory, and power resources.

Embodiments of the invention minimize the cost of passing information between applications and GPUs by rendering graphical information of different types (e.g., text, images, media, vector graphics) based on transformations on (or modifications to) instances of a single type of GPU primitive, or template shape. As such, the single primitive may be described and transferred to the GPU once, while instancing information for each graphical element is transferred to the GPU as a batch, incurring a much smaller transfer penalty than would otherwise be incurred when fully describing each individual graphical element. Even if a relatively large amount of memory is used to describe the single primitive, the penalty of transferring the single primitive to the GPU is spread out across multiple graphical elements that are rendered as a batch based on the primitive.

Figure 1:
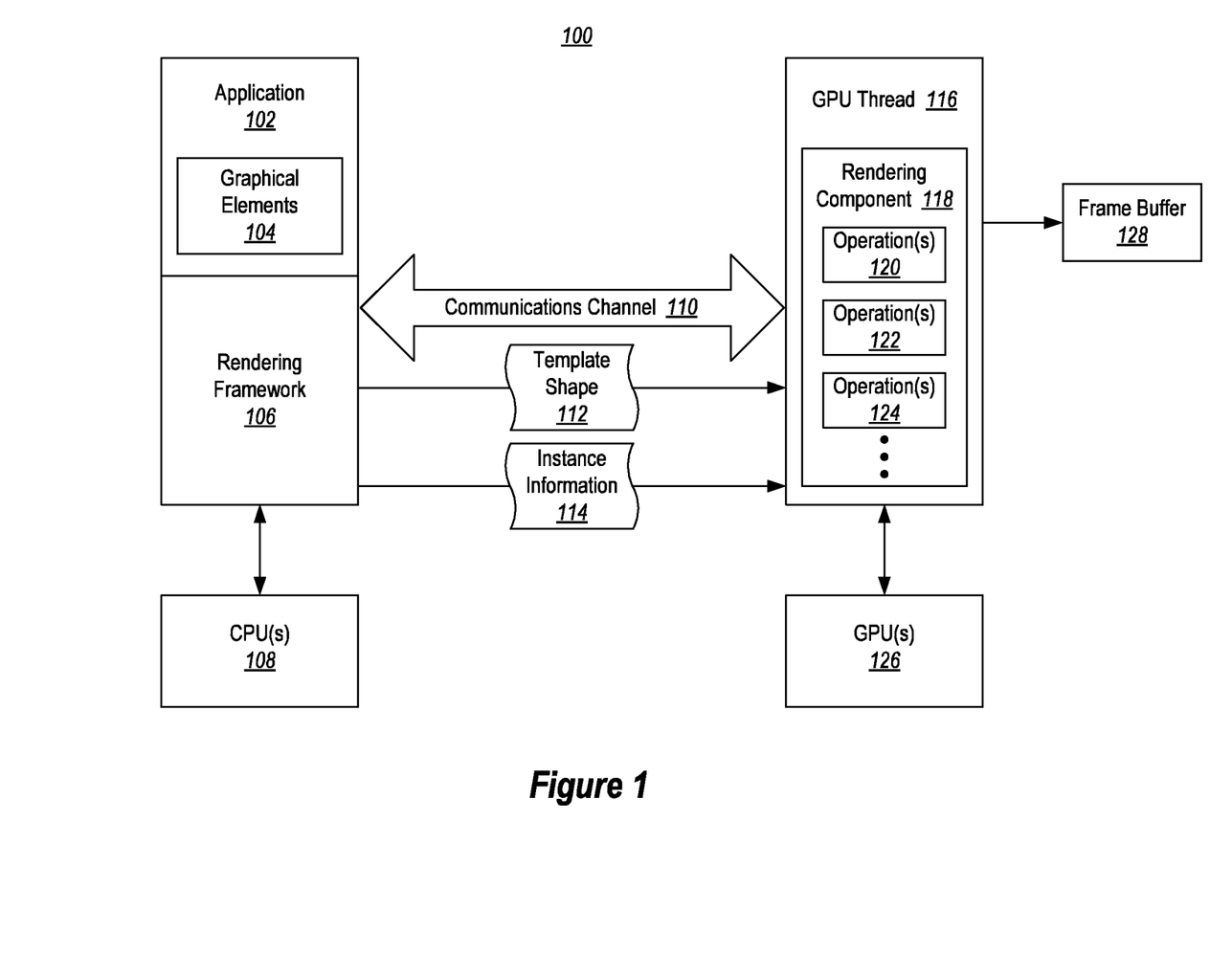
FIG. 1 illustrates an example computer architecture that facilitates rendering a batch of graphical elements using a single primitive type.

FIG. 1, for example, illustrates an example computer architecture 100 that facilitates rendering a batch of graphical elements using a single primitive type. Referring to FIG. 1, computer architecture 100 includes an application 102, a rendering framework 106, and a GPU thread (or process) 116. As shown, the application 102 and the rendering framework 106 can be configured to execute primarily on (or with use of) one or more CPU(s) 108, which can comprise one or more general-purpose and/or special-purpose processors. In addition, the GPU thread 116 can be configured to execute primarily on (or with use of) one or more GPU(s) 126. It will be appreciated that the application 102 and/or the rendering framework 106 can, in some embodiments, also be configured to make direct use of the GPU(s) 126. Similarly, in some embodiments, the GPU thread 116 can be configured to execute primarily on the CPU(s) 108 and utilize the GPU(s) 126 for some processing tasks.

Computer architecture 100 also includes a communications channel 110 configured to facilitate communication of data between the application 102 and/or rendering framework 106 and the GPU thread 116. The type of communications channel used can vary widely depending on the particular configuration of computer architecture 100. For instance, in some embodiments the communications channel 110 may comprise inter-process communication or communication through a shared data structure. Furthermore, in some embodiments the communications channel 110 may comprise a physical bus connecting hardware components. For example, communications channel 110 may comprise a system bus connecting physically disparate hardware components (e.g., USB, PCI, ISA, AGP, etc. busses), an on-chip bus connecting hardware components on a single integrated circuit chip (e.g., system-on-a-chip designs), an on-package bus connecting hardware components on a single package or module (e.g., system-in-a-package designs), or any other appropriate bus.

The application 102 comprises an application executing at a computer system. For instance, application 102 may comprise an operating system (or an operating-system level program) or an end-user program. While shown as a single unit, application 102 can comprise a plurality of components or modules, such as programs, threads, processes, etc. As shown, application 102 includes a plurality of graphical elements 104 for display on a display device. In some embodiments, the graphical elements 104 can comprise graphical elements (or controls) of a user interface generated by the application 102, such as user interface widgets. However, the graphical elements 104 can comprise any graphical information related to the application 102, such as content displayed by the application (e.g., text, images, video media, vector graphics), whether the content is displayed in connection with a user interface or not. As such, the graphical elements 104 can comprise many different types of graphical content in the form of user interface elements (widgets), media, text, gaming content, models, etc.

The application 102 makes use of (or directly contains) the rendering framework 106, which renders the graphical elements 104 while leveraging the GPU thread 116. The rendering framework 106 can, itself, comprise multiple applications, threads or processes, such as one or more user interface or application threads, one or more composition or render thread(s), etc. The rendering framework 106 is configured to convert the graphical elements 104 of the application 102 to a format consumable by the GPU thread 116, and to send these graphical elements to the GPU thread 116 for further processing and rendering.

As such, the rendering framework 106 is configured to generate (or access) a template shape 112, and to create instance information 114 that instructs the GPU thread 116 how to modify instances of the template shape to render each graphical element 104. The rendering framework 106 is configured to then send the instance information 114 and the template shape 112 to the GPU thread 116 over the communications channel 110 for rendering. The rendering framework 106 may, in some embodiments, not send the template shape 112, as the GPU thread 116 may already have independent access to the template shape 112. By sending instance information 114 to the GPU thread 116 instead of sending complete and independent descriptions of the graphical elements 104, the rendering framework 106 can send far less data to the GPU thread 116 than would conventionally be sent. In some embodiments, the instance information 114 can include information that would be applicable to rendering multiple frames of the graphical elements 104, further reducing the amount of data transferred over the communications channel 110. While not shown, the rendering framework 106 can also send or make available any additional information appropriate to rendering the graphical elements, such as one or more texture atlases. For instance, the rendering framework 106 can also send texture atlas(es) to the GPU thread 116 over the communications channel 110, or make the texture atlas(es) available to the GPU thread 116 through shared memory.

The template shape 112 can comprise a single primitive type that is usable to render virtually any type of graphical element. In some embodiments, for example, the template shape 112 can comprise a rectangle described as vertices of a plurality of polygons (e.g., triangles). While the template shape 112 may be described relatively simply (e.g., as one or two polygons), it may also be significantly complicated to describe. For instance, the template shape 112 may be described as a rectangle having an outer border on each side, which can aid in applying anti-aliasing to any graphical elements rendered from the template shape. As such, the template shape 112 may be described using tens, or even hundreds, of vertices. In some embodiments, the template shape can take forms other than a rectangle, such as arcs, circles, triangles, etc.

The instance information 114 is formatted in manner that instructs the GPU thread 116 how to transform or modify instances of the template shape 112 to render each instance as one of the graphical elements 104. The instance information 114 may comprise, for example, a vertex buffer containing entries for each graphical element 104 which define one or more transforms (e.g., position, rotation), clipping information (i.e. when a graphical element is partially hidden by other elements), texture atlas coordinate(s) to textures/masks for filling the template shape, width and height information, colors, opacity, etc. As such, the instance information 114 can contain a "batch" of graphical elements 104, which can be sent over the communications channel 110 to the GPU thread 116 efficiently.

The GPU thread 116 is configured to receive the instance information 114 and the template shape 112, and to render each graphical element described by the instance information 114 using a different instance of the template shape. In other words, the GPU thread 116 is configured to create a copy of the template shape 112 for each graphical element, and to modify/transform each copy according to the instance information 114 for the corresponding graphical element. As shown, the GPU thread 116 can be configured with a rendering component 118 (e.g., one or more shaders) which applies a series of operations (i.e., operations 120, 122, and 124) to instances of the template shape to render each graphical element and to form a scene in a frame buffer 128 for display. As illustrated by the vertical ellipses, the rendering component 118 can apply any number of operations in addition to those expressly described.

For example, based on one or more of the transform, the clip, or the width and height contained in the instance information, the rendering component 118 is configured to apply one more first operations 120. These first operations 120 modify an instance of the template shape to position the instance within the scene so that it aligns with the corresponding graphical element. This can involve applying operations to the instance of the template shape that alter position, scaling, rotation, clipping, orientation, perspective, etc.

Once the rendering component 118 has modified the instance of the template shape to position it within the scene, the rendering component 118 is configured to apply one or more second operations 122 which fill the instance. For example, the second operations(s) can fill the template shape according to a mask and/or a brush. The mask can specify the shape or coverage of the corresponding graphical element (including opacity), and the brush can specify textures, colors, gradients, etc. The second operation(s) 122 can rely, at least in part, on texture and/or mask information stored in a texture atlas, and which is identified by (u, v) coordinates in the instance information 114.

The rendering component 118 can also be configured to apply one or more third operations 124 that anti-alias the modified and filled instance of the template shape. In some embodiments, the third operation(s) 124 may apply anti-aliasing on a portion of the template shape (e.g., on less than all four sides of a rectangle, if the template shape is a rectangle). Selective anti-aliasing can be useful, for instance, when multiple graphical elements are pieced together to form a scene, and when anti-aliasing bordering edges would create a non-uniform seam between the elements.

Figure 2A:
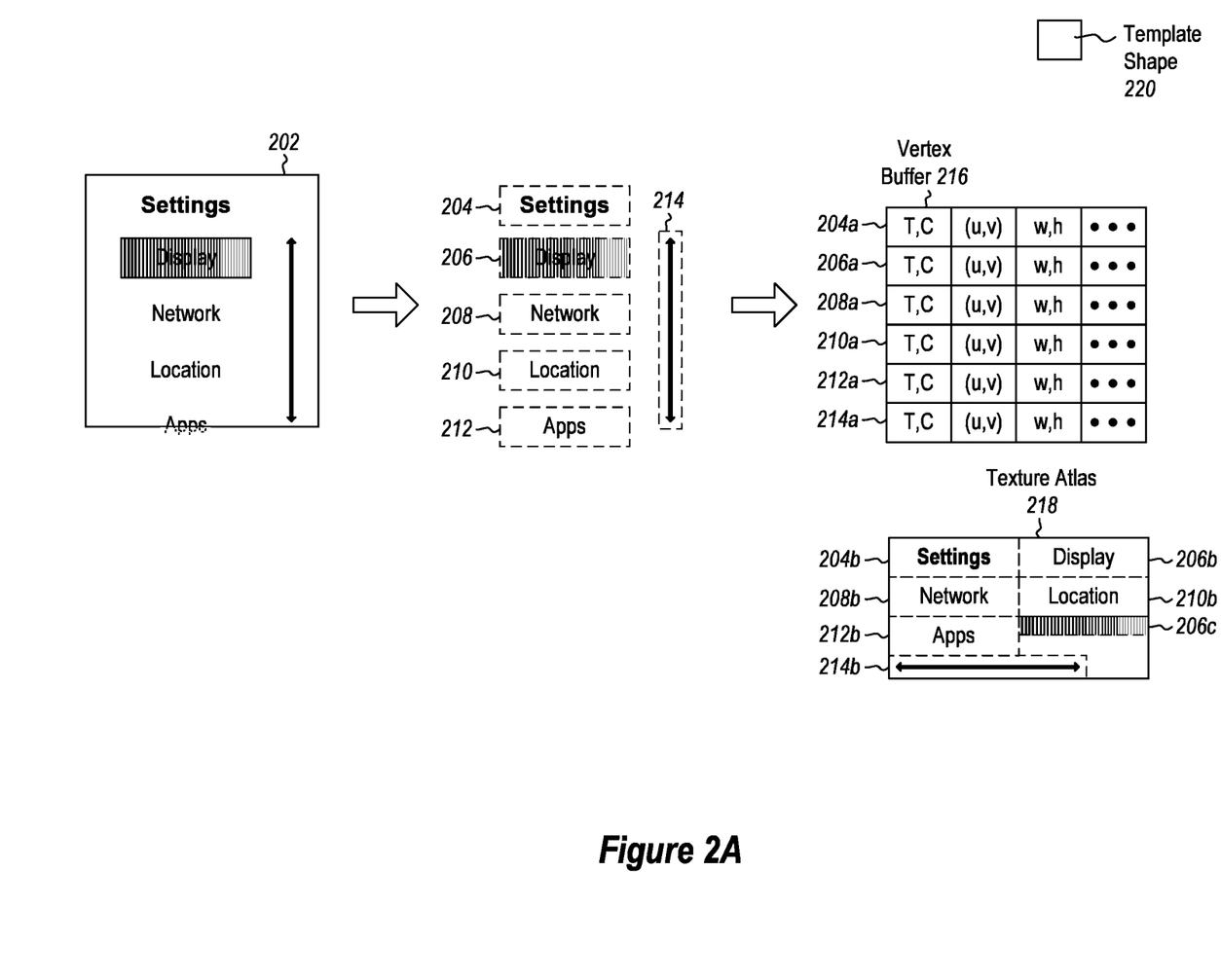
FIG. 2A illustrates a flow diagram of embodiment for representing a user interface for processing at a graphics processing unit.

FIG. 2A illustrates an exemplary flow diagram for representing graphical elements of a user interface 202, such as a settings screen of an application, using computer architecture 100. FIG. 2 shows that the user interface 202 can be conceptually divided into a plurality of graphical elements, including a title element 204 (i.e., "Settings"), a plurality of menu item elements 206, 208, 210, 212 (i.e., "Display," "Network," "Location," and "Apps," respectively), and a vertical scroll bar element 214. Of note, the menu item element 206 ("Display") includes a horizontal gradient, indicating that it is presently selected, and menu item element 212 ("Apps") is partially cut off by the edge of the user interface scene and has thus been "clipped" (as indicated by the dashes). It will be appreciated that the illustrated graphical elements represent only one manner in which the user interface 202 may be divided into graphical elements, and that other configurations are possible. For example, in some embodiments the scroll bar may be further divided into additional graphical elements.

Each of the graphical elements of the user interface 202 can be represented as instance data based on a template shape 220 (e.g., a single primitive type corresponding to a rectangle). As such, the graphical elements of the user interface 202 can be represented as entries in a vertex buffer 216, as well as mask and texture data in a texture atlas 218, which are consumable for rendering at the GPU thread 116. As shown, the vertex buffer 216 can contain an entry for each graphical element (i.e., entries 204a, 206a, 208a, 210a, 212a, and 214a). Each entry can describe how to transform a corresponding instance of the template shape for rendering the instance as the corresponding graphical element. As illustrated, for example, each entry may contain a transform (T), a clip (C), (u, v) coordinates within the texture atlas 218, and a width and height (w, h), among other things.

The texture atlas 218 can contain masks, textures, or any other information usable for filling each template shape instance. For example, the texture atlas 218 can include masks 204b, 206b, 208b, 210b, 212b, and 214b which represent the text of the menu items and the scroll bar. In some embodiments, the masks can comprise alpha masks which describe the relative coverage of each pixel of the graphical element in terms of transparency/opacity. For example, each pixel may be represented on a numeric scale indicating relative levels of transparency/opacity for the pixel (e.g., an 8-bit scale from 0 to 255, where 0 represents no coverage, or fully transparent, and where 255 represents full coverage, or fully opaque). Of course, many other form of representing the shape or coverage of a graphical element are within the scope of the present embodiments. The texture atlas 218 can also include a texture 206c representing the gradient of menu item element 206 ("Display"). As shown, the texture 206c may comprise a one-pixel high gradient that can be applied repeatedly.

Figure 2B:
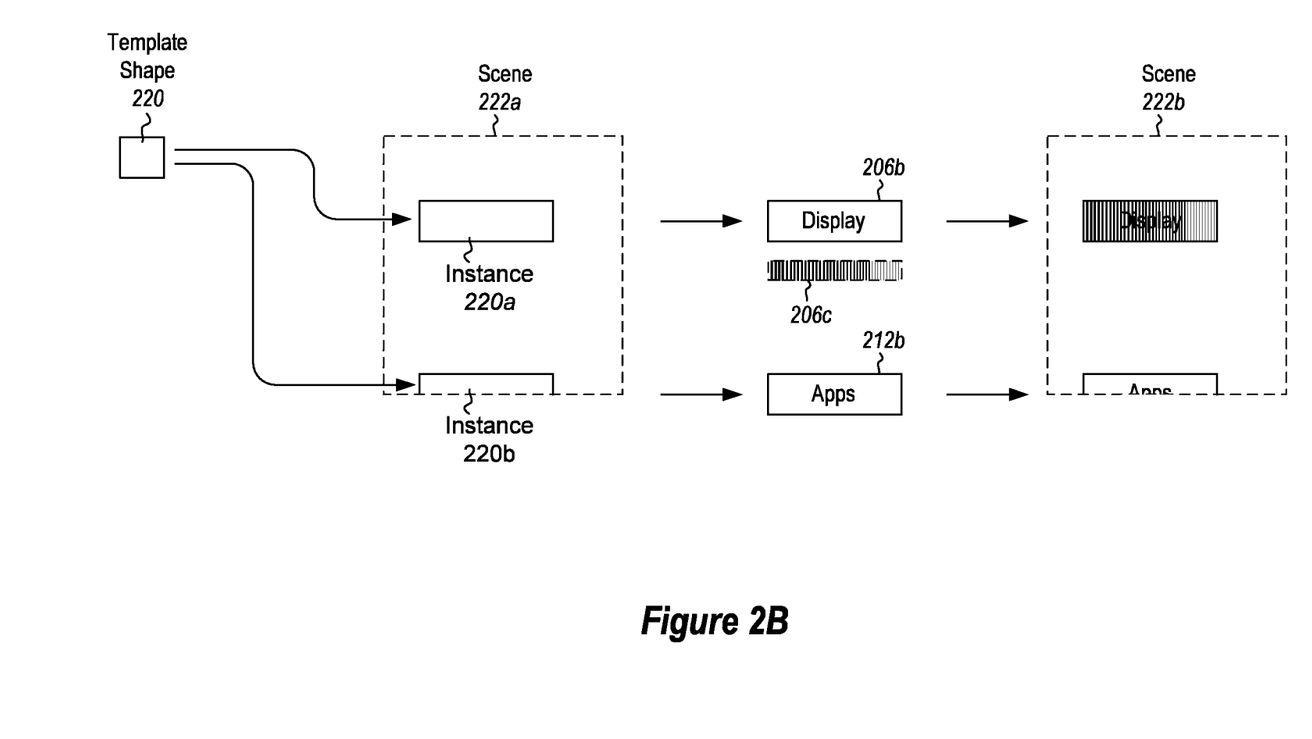
FIG. 2B illustrates a flow diagram of an embodiment for rendering a plurality of graphical elements using a single primitive type.

Turning to FIG. 2B, illustrated is an exemplary flow diagram for rendering some of the graphical elements of the user interface 202 using the computer architecture 100. For ease in description, two of the graphical elements (elements 206 and 212) are illustrated. As shown, the GPU thread 116 can create copies or instances of the template shape 220, and position these instances within a scene 222a. In particular, FIG. 2B illustrates that the GPU thread 116 creates an instance 220a corresponding to menu item element 206 ("Display") and an instance 220b corresponding to menu item element 212 ("Apps"). In addition, the GPU thread 116 modifies these instances so that they correspond to the position/size of the corresponding graphical elements. Thus, the instance 220a has been positioned and resized so that it corresponds with the location and size of the menu item element 206, and the instance 220b has been positioned, resized, and clipped so that it corresponds with the location, and size of the menu item element 220b. The GPU thread 116 can perform these operations based on entries 206a and 212a in the vertex buffer 216 (e.g., based on the transform (T), the clip (C), and the width and height (w, h)).

After properly positioning the instances 220a and 220b within the scene 222a, the GPU thread 116 fills these instances. For example, the GPU thread 116 uses the mask 206b and the texture 206c from the texture atlas 218 to fill the instance 220a with the appropriate graphical content. This may involve brushing the gradient texture 206c onto the instance 220a (possibly in a repeating manner) to apply the horizontal gradient, and multiplying values of the mask 206b with other appropriate brush information (e.g., colors or textures) to fill the instance 220a with the appropriate text ("Display"). The GPU thread 116 also uses the mask 212b from the texture atlas 218 to fill the instance 220b with the appropriate textual content. This may involve multiplying values of the mask 206b with appropriate brush information (colors, textures, etc.) to fill the instance 220b with the appropriate text ("Apps"). Notably, because the instance 220b was clipped, only the top portion of the text is applied. The GPU thread 116 can perform these operations based on entries 206a and 212a in the vertex buffer 216 (e.g., based on the texture atlas coordinates). Thus, a resulting rendered scene 222b can include rendered versions of menu item elements 206 and 212. While not shown, the GPU thread 116 can also perform anti-aliasing on these elements if desired.

Accordingly, FIGS. 1-2B illustrate a computer architecture 100 that facilitates efficient rendering of graphical information while reducing the amount of data transferred between applications and GPUs, which is a potentially costly and performance-degrading operation. In particular, a single template shape or primitive type can be sent to the GPU once, while a "batch" of instance information (i.e., instance information for a plurality of graphical elements) can also be sent to the GPU, causing each graphical element described by the instance information to be rendered as instances of the single template shape or primitive.

Figure 3:
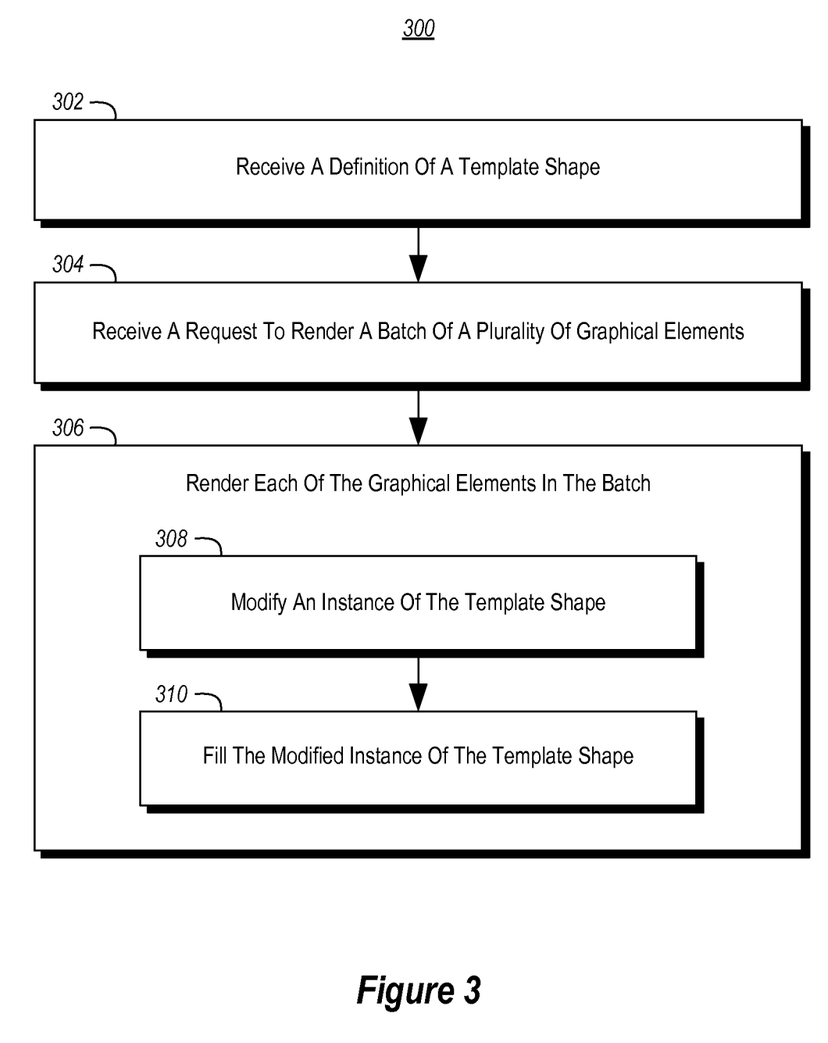
FIG. 3 illustrates a flow chart of an example method for rendering different types of graphical content.

FIG. 3 illustrates a flow chart of an example method 300 for rendering different types of graphical content. Method 300 will be described with respect to the components and data of computer architecture 100.

Method 300 includes receiving a definition of a template shape (act 302). Act 302 can comprise an act of receiving a definition of a template shape that represents a single primitive type used for rendering different types of graphical content. For example, the GPU thread 116 can receive or otherwise access template shape 112. The template shape 112 can comprise any primitive (e.g., a rectangle) usable for rendering different graphical elements through modifications to the primitive.

Method 300 also includes receiving a request to render a batch of a plurality of graphical elements (act 304). Act 304 can comprise an act of receiving a request to render a batch of a plurality of graphical elements, including at least two graphical elements having different content types. For example, the GPU thread 116 can receive, over communications channel 110, instance information 114 which defines a plurality of graphical elements to render as instances of the template shape 112. The instance information 114 can, in some embodiments, comprise a vertex buffer (e.g., vertex buffer 216) defining instance data, including one or more of position, scaling, rotation, transparency, clipping, color, or orientation of said graphical element. The instance information 114 can also include or be associated with a texture atlas (e.g., texture atlas 218) which defines masks, textures, colors, gradients, etc. used for filling the template shape.

In addition, method 300 includes rendering each of the graphical elements in the batch (act 306). Act 306 can comprise an act of rendering each of the graphical elements in the batch of graphical elements. For example, the GPU thread 116 can create an instance of the template shape 112 for each graphical element described in the instance information 114, and apply a series of operations (e.g., operation(s) 120, 122, 124) to each instance using its rendering component 118. As a result, the GPU thread 116 can fill the frame buffer 128 with rendered graphics information for display on a display device.

Act 306 can include, for each graphical element, modifying an instance of the template shape (act 308). Act 308 can comprise an act of modifying an instance of the template shape according to one or more of transformation data, clip data, or width and height data corresponding to said graphical element. For example, as represented by scene 222a, the GPU thread 116 can use the first operation(s) 120 to modify one or more of size, position, orientation, or clip, etc. of the instance of the template shape so that it corresponds with the position, size, orientation, perspective etc. of the corresponding graphical element within the rendered scene. The GPU thread 116 can leverage information such as transform, clip, and width and height in the instance information 114 to perform the modification.

Act 306 can also include, for each graphical element, filling the modified instance of the template shape (act 310). Act 310 can comprise an act of filling the modified instance of the template shape according to one or more of a shape of said graphical element or a brush representing filled content of said graphical element. For example, the GPU thread 116 can use the second operation(s) 122 to apply graphical content from a texture atlas to the modified instance of the template shape. This can involve filling the modified instance of the template shape according to a mask that represents the shape of said graphical element and/or filling the modified instance of the template shape according to a brush that applies one or more of a texture, an image, a gradient, or a fill color to the modified instance of the template shape. In particular, if using an alpha mask representing the shape or coverage of the graphical element, act 310 can include multiplying values of the alpha mask with values of the brush representing filled content of the graphical element, and applying the multiplied values to the modified instance of the template shape. As a result, a rendered scene (e.g., scene 222b) can now include the rendered graphical element.

Although not illustrated, act 306 can also include, for each graphical element, an act of applying anti-aliasing to the modified and filled instance of the template shape. For example, the GPU thread 116 can use the third operation(s) 124 to apply anti-aliasing to all or part of the modified and filled instance of the template shape.

Figure 4:
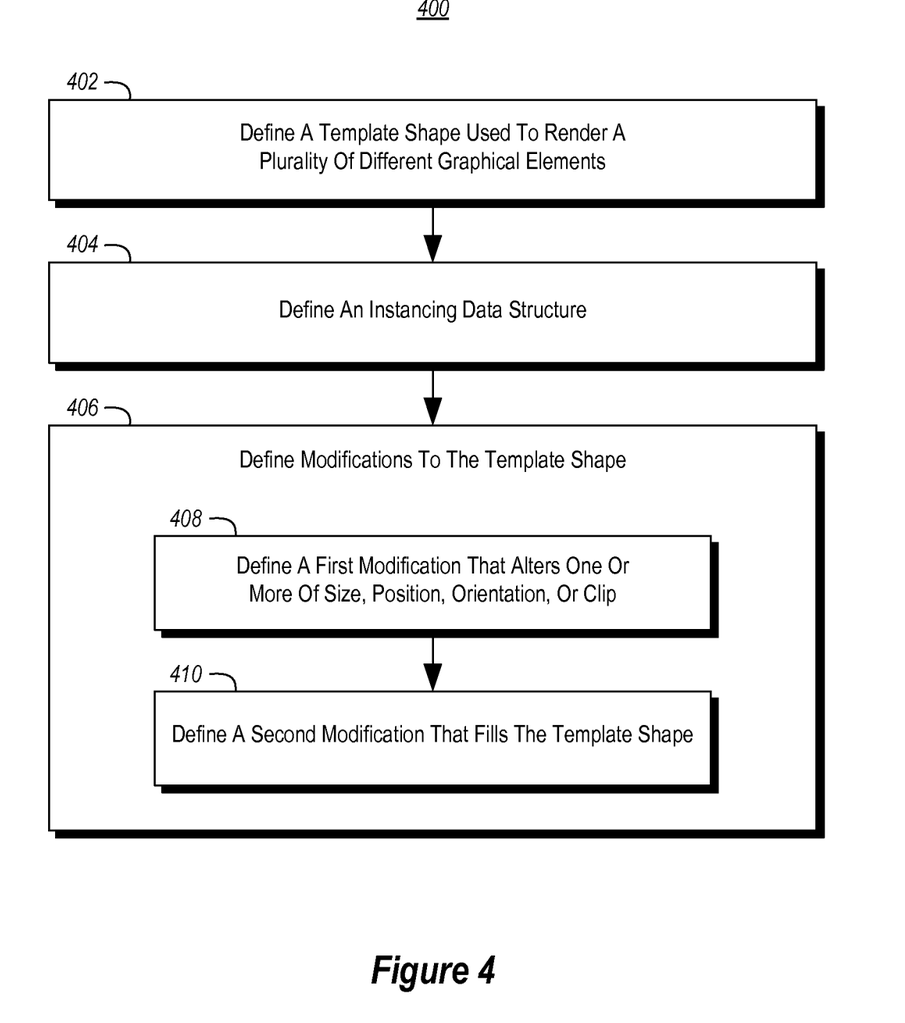
FIG. 4 illustrates a flow chart of an example method for defining a graphical transformation function.

FIG. 4 illustrates a flow chart of an example method 400 for defining a graphical transformation function. Method 400 will be described with respect to the components and data of computer architecture 100.

Method 400 includes defining a template shape used to render a plurality of different graphical elements (act 402). Act 402 can comprise an act of defining a template shape used to render a plurality of different graphical elements having different content types. For example, the rendering framework 106 can define template shape 112 as a single primitive type for use then generating the instance information 114 for the graphical elements 104.

Method 400 also includes defining an instancing data structure (act 404). Act 404 can comprise an act of defining an instancing data structure that contains instance data specifying how to render a batch of plurality of graphical elements, based on performing a plurality of modifications to the template shape using corresponding instance data for each of the plurality of graphical elements. For example, the rendering framework 106 can define a vertex buffer format (e.g., vertex buffer 216) for use in describing the instance information 114 for the graphical elements 104. Furthermore, the rendering framework 106 can define a texture atlas format (e.g., texture atlas 218) for storing masks, textures, etc. used when describing the graphical elements 104.

In addition, method 400 includes defining modifications to the template shape (act 406). Act 406 can comprise an act of defining the plurality of modifications to the template shape. For example, the rendering framework 106 and/or the GPU thread can define operations performed by the rendering component 118 when processing instances of the template shape 112 according to the instance information 114.

Act 406 can include defining a first modification that alters one or more of size, position, orientation, or clip (act 408). Act 408 can comprise an act of defining a first modification that alters one or more of a size, a position, an orientation, or a clip of the template shape based on a particular graphical element selected from the plurality of graphical elements. For example, the rendering framework 106 and/or the GPU thread can define first operations 120 which leverage information in the instance information 114 to position and size instances of the template shape within a scene so that they match the position and size of corresponding graphical elements.

Act 406 can include defining a second modification that fills the template shape (act 410). Act 410 can comprise an act of defining a second modification that fills the template shape based on one or more of a shape of the particular graphical element or fill content of the particular graphical element. For example, the rendering framework 106 and/or the GPU thread can define second operations 122 which leverage information in the instance information 114 as well as masks, textures, etc. in a texture atlas to fill the instances of the template shape so that they contain the content of the corresponding graphical elements.

Although not shown, act 406 can also include an act of defining a third modification that applies anti-aliasing to the template shape. For example, the rendering framework 106 and/or the GPU thread can define third operations 124 which apply anti-aliasing to the filled instances. In some embodiments, the third operations 124 can apply anti-aliasing to a portion as least some of the instances of the template shape.

Accordingly, embodiments of the invention enable graphical elements of different content types representing a scene to be rendered as a batch based on the single primitive type, thereby reducing data transfer. Each graphical element in the batch is based modifications to instances of a template shape, which represents a single primitive type usable for rendering different types of graphical content. The modifications can include modifying the instance according transformation data, clip data, and/or width and height data to position the instance in a scene, and filling the modified instance according to one or more of shape or brush data corresponding to the graphical element.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for rendering different types of graphical content using instances of a single primitive type, the method comprising:
   receiving a definition of a template shape comprising a single primitive type, wherein the same single primitive type is usable to render each of a plurality of different types of graphical elements;
   receiving a request to render a plurality of graphical elements, including at least two graphical elements having different content types; and
   rendering each of the graphical elements in the plurality of graphical elements by modifying, for each of the graphical elements including the at least two graphical elements having different content types, an instance of the template shape and the same single primitive type and, for each of the graphical elements:
   modifying an instance of the template shape according to one or more of transformation data, clip data, or width and height data corresponding to the graphical element; and
   filling the modified instance of the template shape according to one or more of a shape of said graphical element or a brush representing filled content of the graphical element.

2. The method as recited in claim 1, wherein the plurality of graphical elements comprise a plurality of graphical user interface (GUI) elements, and wherein the plurality of graphical elements include two or more of a first type of GUI control, a different second type of GUI control, text, an image, a video, or a vector graphic.

3. The method as recited in claim 1, wherein for each graphical element the rendering also includes:
   subsequent to filling the modified instance of the template shape, an act of applying anti-aliasing to the modified and filled instance of the template shape.

4. The method as recited in claim 3, wherein applying anti-aliasing to the modified and filled instance of the template shape comprises an act of selectively applying anti-aliasing to only a portion of the modified and filled instance of the template shape.

5. The method as recited in claim 1, wherein the template shape comprises a template shape built from a plurality of triangles.

6. The method as recited in claim 5, wherein the template shape comprises a rectangle.

7. The method as recited in claim 1, wherein filling the modified instance of the template shape comprises an act of filling the modified instance of the template shape according to a mask that represents the shape of said graphical element.

8. The method as recited in claim 1, wherein filling the modified instance of the template shape comprises an act of filling the modified instance of the template shape according to a brush that applies one or more of a texture, an image, a gradient, or a fill color to the modified instance of the template shape.

9. The method as recited in claim 1, wherein a graphical processing unit performs rendering each of the plurality of graphical elements in the plurality of graphical elements.

10. The method as recited in claim 1, wherein filling the modified instance of the template shape according to one or more of a shape of said graphical element or a brush representing filled content of said graphical element comprises:
    multiplying values of an alpha mask representing the shape of said graphical element and values of the brush representing filled content of said graphical element; and
    applying the multiplied values to the modified instance of the template shape.

11. The method as recited in claim 1, wherein receiving a request to render a plurality of graphical elements comprises an act of receiving a data structure defining instance data for each of the plurality of graphical elements, the instance data defining one or more of position, scaling, rotation, transparency, clipping, color, or orientation of said graphical element.

12. The method as recited in claim 11, wherein modifying an instance of the template shape and filling the modified instance of the template shape comprises modifying and filling the template shape using the instance data in the data structure.

13. The method as recited in claim 1, wherein modifying an instance of the template shape according to one or more of transformation data, clip data, or width and height data corresponding to said graphical element comprises modifying one or more of a size, a position, an orientation, or a clip of the instance of the template shape.

14. At a computer system including one or more processors and system memory, a method for defining a graphical transformation function, the method comprising:
    defining a template shape comprising a single primitive type, wherein the same single primitive type is usable to render each of a plurality of different graphical elements having different content types;
    defining a data structure that contains instance data specifying how to render each of a plurality of graphical elements, including at least two graphical elements having different content types, by performing modifications to each of a plurality of instances of the template shape and the same single primitive type using corresponding instance data for each of the plurality of graphical elements including the at least two graphical elements having different content types; and
    defining the plurality of modifications to the template shape, including:
        defining a first modification that alters one or more of a size, a position, an orientation, or a clip of the template shape based on a particular graphical element selected from the plurality of graphical elements; and
        defining a second modification that fills the template shape based on one or more of a shape of the particular graphical element or fill content of the particular graphical element.

15. The method as recited in claim 14, wherein for each of the plurality of graphical elements, the instance data includes one or more of a transformation, a clip, a width and a height, specification of a mask, or specification of fill content.

16. The method as recited in claim 15, wherein the fill content comprises one or more of a texture, an image, a gradient, or a fill color.

17. The method as recited in claim 14, wherein the plurality of modifications to the template shape also include a third modification that applies anti-aliasing to the template shape.

18. The method as recited in claim 17, wherein the third modification that applies anti-aliasing to the template shape applies anti-aliasing to a portion of the template shape.

19. The method as recited in claim 14, wherein the second modification fills the template shape based on the shape of the particular graphical elements by applying an alpha mask that defines an alpha value for a plurality of pixels corresponding to the particular graphical element.

20. A computer system, comprising:
    one or more processors;
    at least one graphics processing unit (GPU); and
    one or more computer storage media having stored thereon computer-executable instructions that, when executed at the one or more processors, cause the computer system to perform a method for rendering graphical primitives of a graphical user interface (GUI), the method comprising:
    identifying a first vertex buffer defining a template shape comprising a single primitive type, wherein the same single primitive type is usable to render each of a plurality of different types of graphical elements;
    identifying a second vertex buffer representing a plurality of graphical elements of a GUI that are to be rendered as instances of the template shape and the same single primitive type, at least two of the graphical elements comprising different types of content, the second vertex buffer defining, for each graphical element, instance data including: transformation data, clip data, width and height data, and one or more coordinates within a texture atlas; and
    rendering each of the plurality of graphical elements, including at least two of the graphical elements comprising different types of content, as a batch on the GPU, by, for each graphical element:
        modifying an instance of the template shape and the same single primitive type according to one or more of the transformation data, the clip data, or the width and height data corresponding to the instance data of the graphical element; and
        filling the modified instance of the template shape according to a shape mask representing a shape of said graphical element and a brush representing filled content of said graphical element, one or more of the shape mask and filled content retrieved from the texture atlas according to the one or more coordinates within the texture atlas specified in the instance data of the graphical element.

* * * * *